United States Patent [19]

Bibel

[11] Patent Number: 5,278,775
[45] Date of Patent: Jan. 11, 1994

[54] METHOD OF TIGHTENING THREADED FASTENERS

[75] Inventor: George D. Bibel, Hudson, Ohio

[73] Assignee: The University of Akron, Akron, Ohio

[21] Appl. No.: 768,048

[22] Filed: Sep. 30, 1991

[51] Int. Cl.⁵ .................. G01L 5/24; G05D 17/02
[52] U.S. Cl. .................. 364/508; 364/551.01; 73/761
[58] Field of Search ............. 364/506, 508, 551.01, 364/553; 73/761; 81/52, 467; 173/176, 182

[56] References Cited

U.S. PATENT DOCUMENTS

| | | | |
|---|---|---|---|
| 4,375,120 | 3/1983 | Sigmund | 173/176 |
| 4,413,396 | 11/1983 | Wallace et al. | 29/407 |
| 4,563,734 | 1/1986 | Mori et al. | 364/553 |
| 4,685,050 | 8/1987 | Polzer et al. | 364/508 |
| 4,969,105 | 11/1990 | Gaenssle | 364/508 |

OTHER PUBLICATIONS

D. H. Van Campan; A Systematic Bolt-Tightening Procedure for Reactor Vessel Flangs; First International Conference on Pressure Vessel Technology; Sep. 1969–Oct. 1969; pp. 131–141.

J. H. Bickford; The Bolting Technology Council and the Search for More Accurate Preload; Advances in Bolted Joint Technology, PVP vol. 158, Honolulu, HI; Jul. 1989.

Primary Examiner—Gary Chin
Assistant Examiner—Michael Zanelli
Attorney, Agent, or Firm—Oldham, Oldham & Wilson Co.

[57] ABSTRACT

The invention provides a method for tightening threaded fasteners in a flange joint or the like, which comprises initially tightening each fastener to a predetermined initial load or stress, measuring the final load, stress, strain or elongation of each fastener after all fasteners have been tightened, and calculating interaction coefficients from the experimental data thus obtained. The interaction coefficients are representative of elastic interactions occurring between each fastener in the system, and enable an initial fastener strain value or load to be predicted for each fastener in the system. Using the predicted initial strain, stress or load values and the interaction coefficients for each fastener and applying an initial stress to each bolt in a second test in accordance with these calculations, allows updating of the interaction coefficient values along with the predictions of initial loads so as to enable calculation of preloads on each bolt which will yield essentially uniform bolt stress. The method compensates for elastic interactions between fasteners in the system and is self-correcting to reduce effects of flange surface misalignment.

7 Claims, 4 Drawing Sheets

Final bolt stresses for a three test sequence (no gasket) on a 16" flange.

METHOD OF TIGHTENING THREADED FASTENERS

TECHNICAL FIELD

This invention relates to a method for achieving a substantially uniform load in all of the fasteners of a joint to provide increased joint reliability and to significantly reduce the time necessary to perform a tightening sequence for a particular joint system.

BACKGROUND

The problem of achieving a uniform stress in all the fasteners of a flange joint or connection has been known for some time. There have been a number of studies by different investigators, and numerous patents and publications have resulted.

Typical attempts at solving the problem of obtaining uniform stress in all fasteners such as bolts of a bolted joint, involved methods of torque control with multiple passes of a predetermined tightening sequence. A "pass" in the context of bolt tightening refers to tightening of all of the bolts in a joint once. Such attempts sometimes assume that the application of essentially uniform torque to each bolt during tightening will result in essentially uniform stresses in all of the bolts in the tightened joint. For example, U.S. Pat. No. 4,969,105 is representative of tightening methods involving torque control. The patent describes a method for tightening bolts in a gasketed joint and includes a method for compensating for gasket compression, which has been found to induce the undesirable effect of relaxation or loss of fastener tension due to continued compression of a gasket after torque upon a bolt is eliminated. This method includes monitoring and control of a drive system to continuously compare a torque related variable, such that the drive system will apply pulses of torque until the application of torque causes only insignificant increases in gasket compression.

Research has found that the bolt stress for a given applied torque varies greatly due to changes in the coefficient of friction. Research has further shown that interaction between bolts and other alignment problems contribute more to the variation and final bolt loads than do problems associated with torque control. Attention is called to J. H. Bickford, "The Bolting Technology Council and the Search for More Accurate Pre-Load", Advances in Bolted Joint Technology, 1989, PVP Volume 158, Honolulu, Hi. U.S.A., Jul. 23-27, 1989.

Another alternative method involves control of the rotational angle through which a bolt or the like is turned. It has been found that the tightening force or axial tension of the fastener is closely related and increases according to the angle of rotation during tightening. U.S. Pat. Nos. 4,413,396 and 4,685,050 furnish examples of methods for tightening threaded fasteners wherein the torque/rotational angle characteristics are compared and matched with theoretical values to achieve proper tightening of the fastener. Another bolt tightening procedure was described by D. H. Van Campen, "A Systematic Bolt-Tightening Procedure for Reactors Vessel Flanges", First International Conference on Pressure Vessel Technology, Sep. 29, 1969 to Oct. 2, 1969, pages 131-141, 1969. The author, working with bolted flange connections for a high pressure reactor vessel, developed a set of equations for such vessels that involved hydraulic jack pressures and bolt strain.

The test reactor included a bolted flange having 36 bolts which were separated into four series, wherein the method assumed a single constant for all of the bolts in a series. Such an assumption has been found not to hold true, especially as the flange joint becomes more complex. It was further assumed that the flange was symmetrical which assumes either that the flange has no imperfections or that any such perfections are symmetrically located. A further assumption was made in that the elastic interaction between bolts of a system remain constant. The method obtained reasonable agreement between theoretical or calculated jack pressures and those actually required when tightening all bolts to a uniform low pressure, but had much greater discrepancies between theoretical and actual jack pressures when the bolts were tightened to higher pressures.

In spite of the considerable study of the problems of tightening bolts or other threaded fasteners in a joint so as to obtain substantially uniform stress on each bolt, no one heretofore has achieved a method in which all of the bolts in a joint can be tightened to essentially the same final stress after interaction in a single pass, or in a real time operation wherein the number of tightening passes is greatly reduced and joint reliability greatly increased.

SUMMARY OF THE INVENTION

The invention provides a method for tightening threaded fasteners in a flange joint or the like, which comprises initially tightening each fastener to a predetermined initial load or stress, measuring the final load, stress, strain or elongation of each fastener after all fasteners have been tightened, and calculating interaction coefficients from the experimental data thus obtained. The interaction coefficients are representative of elastic interactions occurring between each fastener in the system, and enable an initial fastener strain value or load to be predicted for each fastener in the system. Using the predicted initial strain, stress or load values and the interaction coefficients for each fastener and applying an initial stress to each bolt in a second test in accordance with these calculations, allows updating of the interaction coefficient values along with the predictions of initial loads so as to enable calculation of pre-loads on each bolt which will yield essentially uniform bolt stress. Any joint system being tightened by a plurality of fasteners, such as a bolts, will have a set of equations that can be put into matrix form such that:

$$[A]\{S_i\} = \{S_f\}$$

where:
  $\{S_i\}$ is a 1×n column matrix describing the initial bolt stress, strain or load.
  $\{S_f\}$ is a 1×n column matrix corresponding to the final bolt stress, strain or load.
  [A] is an n×n matrix that correctly transforms $S_i$ into $S_f$.
  n equals the number of bolts in the flange.

The interaction coefficients can be found from any arbitrary test such as tightening all the bolts to the same initial load for example. Once the interaction coefficient matrix is correctly found, the matrix equation can be solved for the required initial bolt loads that give any required final bolt stress.

$$\{S_i\} = [A]^{-1}\{S_f\}$$

The number of simultaneous equations and the number of unknowns is equal to the number of bolts in the joint.

The method of this invention provides a selective overbolting procedure which makes it possible to achieve substantially uniform bolts stresses, ie, within ±2%, with both gasketed and ungasketed joints. Additionally, the method is found to compensate for or be essentially self-correcting for joint surface misalignment or other asymmetrical aspects of a particular joint.

BRIEF DESCRIPTION OF THE DRAWINGS

These and other objects and advantages of the invention will become apparent upon further reading of the detailed description of a preferred embodiment, taken in conjunction with the drawings wherein.

DETAILED DESCRIPTION OF THE INVENTION

Figure 1:
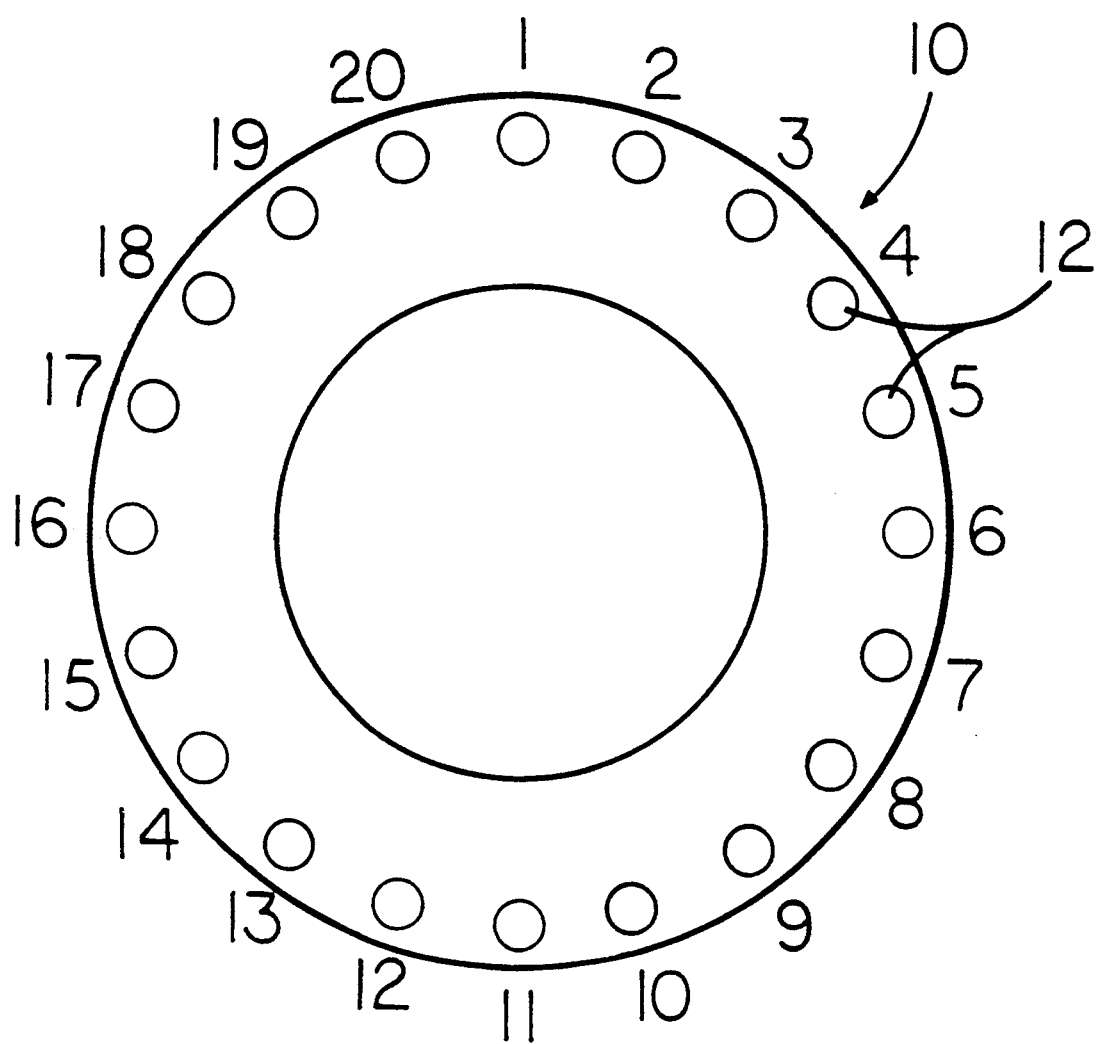
FIG. 1 shows a schematic illustration of a bolted flange indicating the orientation of bolts thereon.
Figure 2:
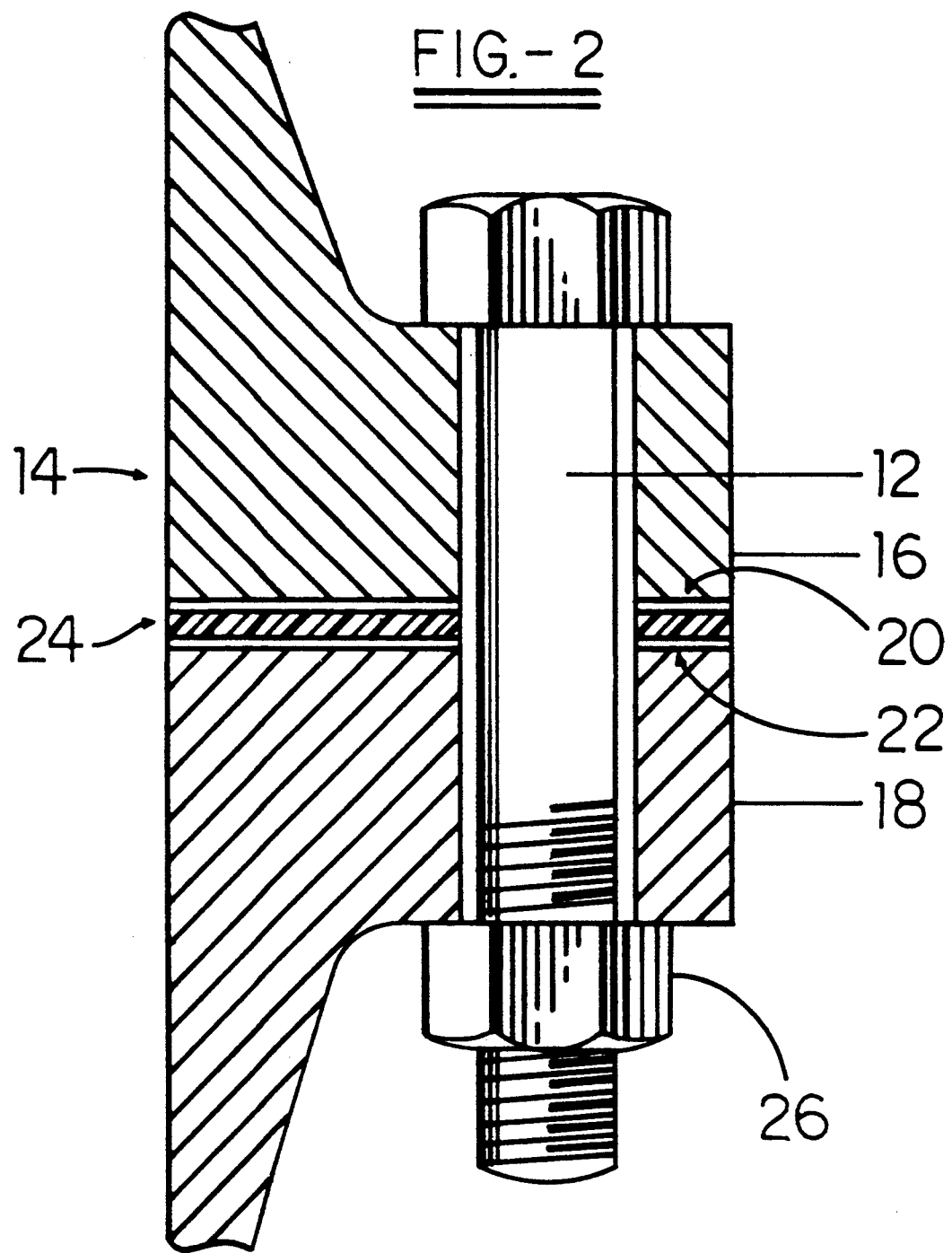
FIG. 2 is a cross-sectional view of a bolted flange at the location of an individual bolt.

Turning now to FIG. 1, there is shown a schematic diagram of a bolted flange, such as found on nuclear reactors, other pressure vessels, engine blocks or the like. The bolted flange is to be secured so as not to allow leakage from the joint, which is accomplished by means of a plurality of bolts 12 or other threaded fastener members. Normally, a gasketed joint is desired, and leakage will depend upon the clamping pressure exerted by the flange members on a gasket interposed therebetween. As seen in FIG. 2, the flange joint generally indicated at 14 comprises first and second flanges 16 and 18 having joint surfaces 20 and 22 which are to be secured to one another. A gasket 24 is positioned between flange surfaces 20 and 22, and a bolt member 12 extends through apertures formed within each of the flange members 16 and 18. The bolt 12 will threadably engage a nut 26 for tightening of the flange joint 14. As previously mentioned, in such bolted flanges, upon implementing a tightening procedure, it is found that tightening of one fastener will often partially relieve or loosen previously tightened fasteners in proximity thereto. This phenomena is termed "elastic interaction" between the fasteners in the system. The elastic interaction between fasteners will greatly effect initial pre-loads placed upon each of the fasteners, thereby complicating the tightening procedure. The problem of achieving uniform stress in all of the fasteners of a joint connection has thus required multiple tightening passes following a detailed tightening procedure, or the implementation of a complicated technique using one of the methods as described in the background of the invention. The problems associated with elastic interaction between bolt members in a particular system has been largely ignored, and thus no effective means for performing a one or limited pass tightening procedure have been effectively implemented.

The present invention provides procedure to compensate for elastic interaction between fasteners in a particular system, to allow subsequent tightening of the flange joint wherein uniform bolt stress is achieved quickly and effectively. In many applications, a flange may be encountered, wherein the tightening or bolt up procedure for the flange will be potentially critical, such as in association with a nuclear reactor. The process of the invention will increase joint reliability and decrease bolt up time on critical flanges as well as other joint systems.

The method of the invention involves the determination of "interaction coefficients" for each fastener, from experimental test data, which may then be used to develop a tightening procedure to allow tightening of the joint in a single pass while obtaining substantially uniform bolt stress. Alternatively, the test procedures can be carried out in a real-time tightening sequence to shorten the time and effort necessary to achieve proper tightening by predicting the shortest possible subsequent tightening procedure for obtaining uniform bolt stress, strain or load. The interaction coefficients define the relationship between initial bolt load, final bolt load and the initial load of adjacent or other bolts in the system. The relationship between these parameters in a joint system may be represented by a set of equations representative of the particular joint system. The basic relationship between a bolt and the adjacent bolts thereto may be expanded to include all the bolts of any size flange or joint system. Each bolt may be represented by a linear equation which defines its relationship to the other bolts of the system. Any bolted flange or other joint system will have a set of equations which may be placed into matrix form such that:

$$[A]\{S_i\} = \{S_f\}$$

where:
- $\{S_i\}$ is a $1 \times n$ column matrix describing the initial bolt stress, strain or load on each of the bolts in the system,
- $\{S_f\}$ is a $1 \times n$ column matrix corresponding to the final bolt stress, strain or load,
- $[A]$ is a $n \times n$ matrix that correctly transforms the matrix $S_i$ into the matrix $S_f$, and
- n equals the number of bolts in the system.

For critical flanges, the joint system may include a large number of bolts. It should be recognized that as the number of bolts increases in a system, the complexity of conventional tightening procedures also increases.

In the invention, with each bolt being represented by a linear equation which defines its relationship to other bolts in the system, the interaction coefficients can be found by the implementation of an arbitrary loading test. In such a test, the bolts of the system are initially tightened to a pre-selected initial load, which may be uniform or variable between the bolts. Once the coefficient matrix is correctly found, the matrix equation can be solved for the required initial bolt loads that give any required final bolt stress. The relationship to solve for the initial bolt loads necessary to achieve uniform stress between the bolts is represented as follows:

$$\{S_i\} = [A]^{-1}\{S_f\}$$

As an example of finding and solving the coefficient matrix for a system, a hypothetical three bolt system will be assumed. Each bolt in this system may be initially tightened to the same initial load, such as for example, 30,000 psi. The interaction data for the system of three bolts initially tightened to 30,000 psi is shown in Table 1 as follows:

TABLE 1

|   | 1 | 2 | 3 |
|---|---|---|---|
| 1 | 30,000 psi | — | — |
| 2 | 25,000 psi | 30,000 psi | — |
| 3 | 22,000 psi | 27,000 psi | 30,000 psi |

As seen in Table 1, the interactions between the three bolts in the system result in final stress values of 22,000 psi, 27,000 psi and 30,000 psi for bolts 1, 2 and 3 respectively. From this interaction data, the interaction coefficients are calculated for the first bolt in the system, and may be referred to $a_{11}$, $a_{12}$ and $a_{13}$. In this example, bolt 1 will be tightened first, and will therefore have no interaction with the other bolts in the system, such that the interaction coefficient $a_{11}$ would be calculated as follows:

$$(a_{11})(30,000) = 30,000$$

$$a_{11}) = 1.0$$

As bolt 2 is tightened, the interaction of bolt 2 on bolt 1 is calculated for the coefficient $a_{12}$ as follows:

$$(1.0)(30,000) + (a_{12})(30,000) = 25,000$$

$$a_{12} = -0.1667$$

and similarly the interaction of bolt 3 on bolt 1 represented by coefficient $a_{13}$ is calculated as follows:

$$(1.0)(30,000) + (0.1667)(30,000) + (a_{13})(30,000) = 22,000$$

$$a_{13} = -0.0999$$

In a common manner, the interaction coefficients for bolts 2 and 3 may be calculated, wherein the interaction of bolt 1 on both bolts 2 and 3 will be zero since bolt 1 has already been tightened and will not effect these bolts upon tightening. Similarly, after bolt 2 has been tightened, it will have no effect upon bolt 3 when it is tightened. A final coefficient values for this three bolt system are shown as follows:

| Bolt 1 | $a_{11} = 1.0$ | $a_{12} = -0.1667$ | $a_{13} = -0.0999$ |
| Bolt 2 | $a_{21} = 0.0$ | $a_{22} = 1.0$ | $a_{23} = -0.1$ |
| Bolt 3 | $a_{31} = 0.0$ | $a_{32} = 0.0$ | $a_{33} = 1.0$ |

From the calculated interaction coefficients, the linear equations defining the joint system and the relationship of one bolt to the other bolts in the system are represented as follows:

$$(1.0)(S_1) - (0.0667)(S_2) - (0.0999)(S_3) = S_{1f}$$

$$(1.0)(S_2) - (0.1)(S_3) = S_{2f}$$

$$(1.0)(S_3) = S_{3f}$$

The simultaneous solution of these equations will result in predicted initial loads for each of the bolts in the system for a pre-selected final bolt stress. It should be seen that a method of determining the interaction coefficients for each bolt in the joint system will allow the subsequent solution for initial bolt loads in any number bolt system.

In the determination of the interaction coefficients for a particular bolt within a joint system, many factors may effect the value of the coefficient calculated. It is found in actual practice, that a flange or other joint system will have non-symmetrical misalignment between the surfaces to be clamped, which introduces non-symmetrical responses to bolt loading and the calculations of interaction coefficients. With such non-symmetrical misalignment at the surfaces of a joint, individual coefficients are needed to accurately predict the initial loads for each bolt which will result in uniform bolt stress. The procedure of calculating the initial loads to achieve uniform bolt loading provides a selective overbolting procedure which will greatly reduce bolt up times for the joint. It has also been found that with respect to flange surface misalignment as well as other factors, the interaction coefficients will not remain constant, and therefore the procedure requires updating of the interaction coefficients to obtain uniform bolt stress within a scatter of only ±2%. In analysis of the interaction coefficient matrix, the majority of the interaction is caused by the two adjacent bolts to a particular target bolt. Although clearly the interactions between adjacent bolts is significant, the other interactions with other bolts of the system are not insignificant and cannot be ignored. It is all of the interactions between bolts in the system which collectively contribute to the final bolt load, and therefore interaction coefficients for each of the bolts in the system are required for accurate results.

It is also found that interaction between bolts changes for different loading conditions, such that if bolting is performed with high clamping force, less interaction between bolts will be induced as compared to bolting which occurs with low clamping forces. It is also found that interaction decreases with increased clamping force, and thus the coefficients stabilize as the correct solution is approached.

As the following actual experimental data will show, the method of tightening a plurality of fasteners of a system to any pre-selected initial loads, which may or may not be uniform, and subsequently measuring stress, strain, load or elongation values of each of the fasteners will enable interaction coefficients to be calculated. Upon a determination of the interaction coefficients for each of the fasteners, initial stress, strain, or load values may be predicted for each of the fasteners. Tightening of the fasteners in the system to the predicted initial loads, and subsequently updating the values of the interaction coefficients and recalculating preloads for each of the bolts will enable uniform bolt stress to be achieved within acceptable tolerance limits. It should be evident that the method allows a bolting procedure to be generated for subsequent tightening of a particular flange or other joint, or the method may be utilized as a real time tool whereby interaction coefficients are determined as the flange or joint is tightened to facilitate decreasing bolt up time. It should also be evident that the reliability of the joint depends upon the ability to obtain a more uniform bolt stress within the system, and therefore the method allows higher joint reliability.

In the following example, the method of the invention is shown to produce uniform bolt stress to a high degree of accuracy.

EXAMPLE 1

Experimental testing of the method was completed on a 16" raised face weld neck flange having 20 bolts in the fastening system. The location of the bolts is schematically illustrated in FIG. 1, and strain measurements for each of the bolts were accomplished by machining off of the threads of the bolts over a 2" section to provide a mounting surface for strain gauges. For the bolts of the system, two strain gauges were mounted 180° apart to compensate for bending. The gauges were read by a data acquisition system and the results linked to a computer for calculating the desired initial preloads. Continuous strain readouts as well as single data point collection and data manipulation was achieved by means of the computer. Although strain values are measured in this example, other measurements such as stress, load or elongation measurements may be performed.

Initial testing for the procedure was performed without a gasket between flange surfaces, and similar testing was also performed with a flat sheet gasket having similar results. In the initial testing procedure, a three test sequence was performed, with each test consisting of one tightening pass using a standard four point star sequence. The bolt tightening sequence as well as the results of strain measurements for each of the tests is shown in Table 3 as follows:

TABLE 3

| Bolt Tightening Sequence | Test 1 Microstrain | Test 2 Calculated From Test 1 | Test 3 Calculated From Test 2 |
| --- | --- | --- | --- |
| 1 | 850 | 1403 | 1407 |
| 11 | 850 | 1373 | 1350 |
| 16 | 850 | 1573 | 1394 |
| 6 | 850 | 1554 | 1437 |
| 2 | 850 | 1139 | 1154 |
| 12 | 850 | 1037 | 1076 |
| 17 | 850 | 1139 | 1136 |
| 7 | 850 | 1142 | 1141 |
| 3 | 850 | 1055 | 1077 |
| 13 | 850 | 1007 | 1027 |
| 18 | 850 | 1019 | 1069 |
| 8 | 850 | 1068 | 1094 |
| 4 | 850 | 1012 | 1023 |
| 14 | 850 | 1012 | 1041 |
| 19 | 850 | 1021 | 1021 |
| 9 | 850 | 993 | 1017 |
| 5 | 850 | 850 | 850 |
| 15 | 850 | 850 | 850 |
| 20 | 850 | 850 | 850 |
| 10 | 850 | 850 | 850 |

In each of the testing procedures, the bolts were snugged by hand before beginning the test to facilitate the elimination of large rigid body motion of the flange. Elimination of rigid body motion may also be achieved by torquing or tensioning groups of bolts in the system simultaneously, so as to simulate simultaneous tensioning. Simultaneous tensioning procedures may be implemented using the procedure of the invention, with the interaction coefficients being calculated similarly regardless of the tightening sequence. Thus, other bolting patterns to eliminate excessive stress on a singular bolt or to eliminate rigid body motion may be used effectively. Precise bolt tension was achieved using continuous strain readout, and tightening was achieved within 15 microstrain (450 psi) of the target stress in the test. The bolts were tightened one at a time with strain values being taken for all bolts after each subsequent tightening.

Figure 3:
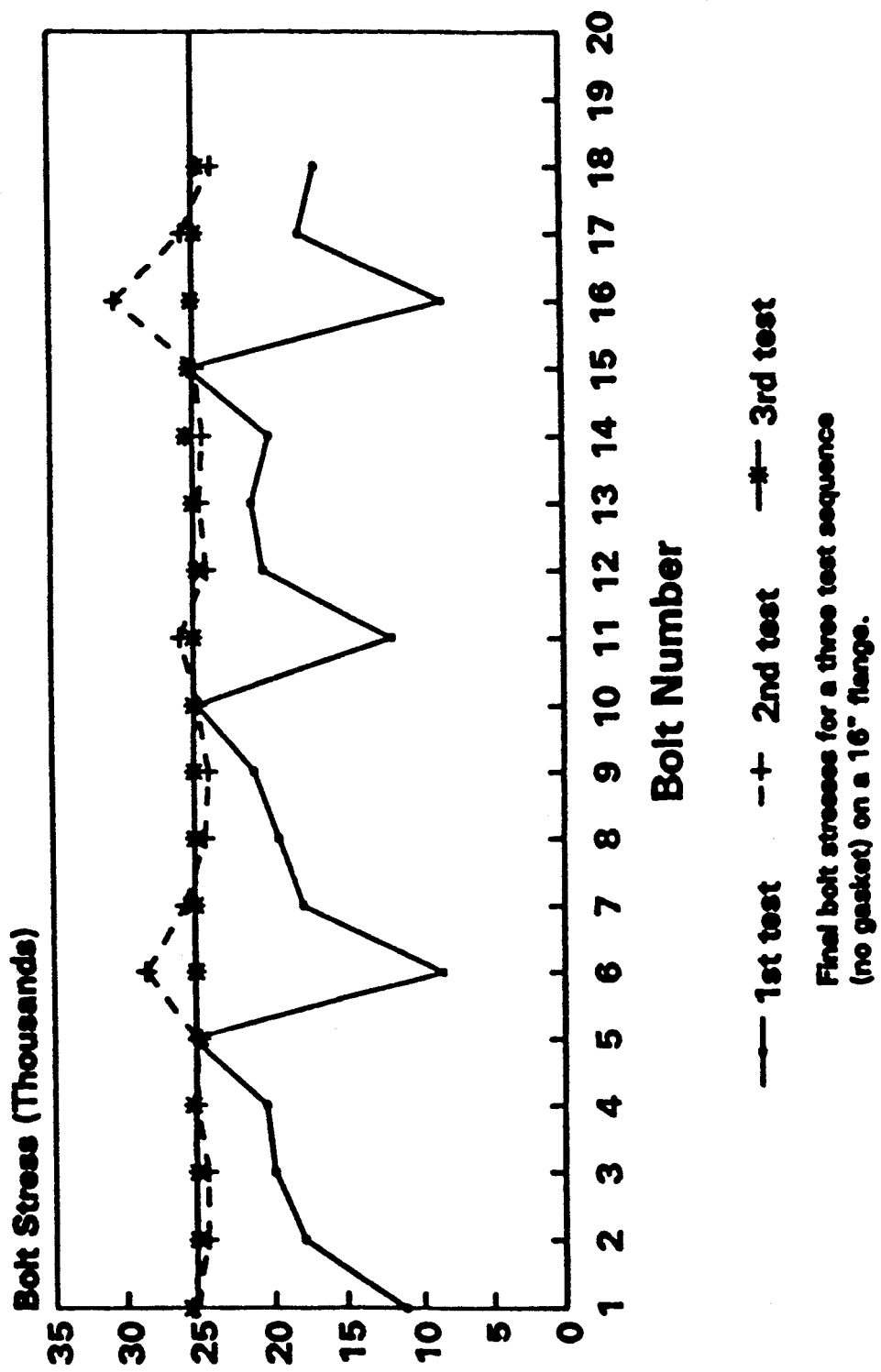
FIG. 3 is a graph indicating final bolt stress during test sequences of tightening.

As seen in Table 3, the testing procedure included a series of three tests with each test consisting of one pass. All the bolts were initially tightened to the same initial load as indicated for the first test, with the final strain values for each of the bolts being used to predict interaction coefficients and initial strains for each bolt for the second test. Data from the second test was then used to again update the interaction coefficients and predictions for the third test, wherein it was found that the interaction coefficients as determined, allowed preload for each of the bolts to be calculated with final bolt stress being substantially uniform and within ±2%. FIG. 3 shows the final bolt stress for each one pass procedure. In test 1, all of the bolts were tightened to approximately 25,000 psi (approximately 850 microstrain) as indicated in Table 2. As seen in FIG. 3, the first test sequence resulted in large variations in bolt stress, with an average value of only 18,500 psi for a target stress of 25,000 psi. In this first tightening sequence, load reductions in various of the bolts of up to 67% were present, due to elastic interaction between the bolts. Using initially calculated interaction coefficients and the final target strain values of each of the bolts, initial strains for each bolt were predicted for the second test. The second test in the series has a average load of 25,000 psi with variations of +17% to −6.5%, being much closer to uniform bolt stress than found in test 1. The average bolt load for the final test is at the target stress of 25,000 psi with a scatter of only ±2%.

As seen the graph of FIG. 3, non-symmetrical interactions between fasteners of the system are noted. Data from the first four bolts tightened on the flange of Example 1 shows "soft" spots, wherein stress reductions of up to 67% can be seen in bolts 6 and 16. It has been found that flange surface misalignment results in a gap of unknown size and location between the flange surfaces. The stiffness of the flange is reduced when such a misalignment gap is opened but becomes stiffer as the gap is closed. Thus, as the joint becomes more rigid with increased bolt loading and gap closure occurs, interactions between bolts are reduced. It may therefore be concluded that an infinitely stiff flange without a gasket would have no interaction, whereas a gasketed joint will behave differently with increased flange stiffness. No infinitely stiff flange is found in real practice, and therefore interactions between fasteners in the system are significant.

Figure 4:
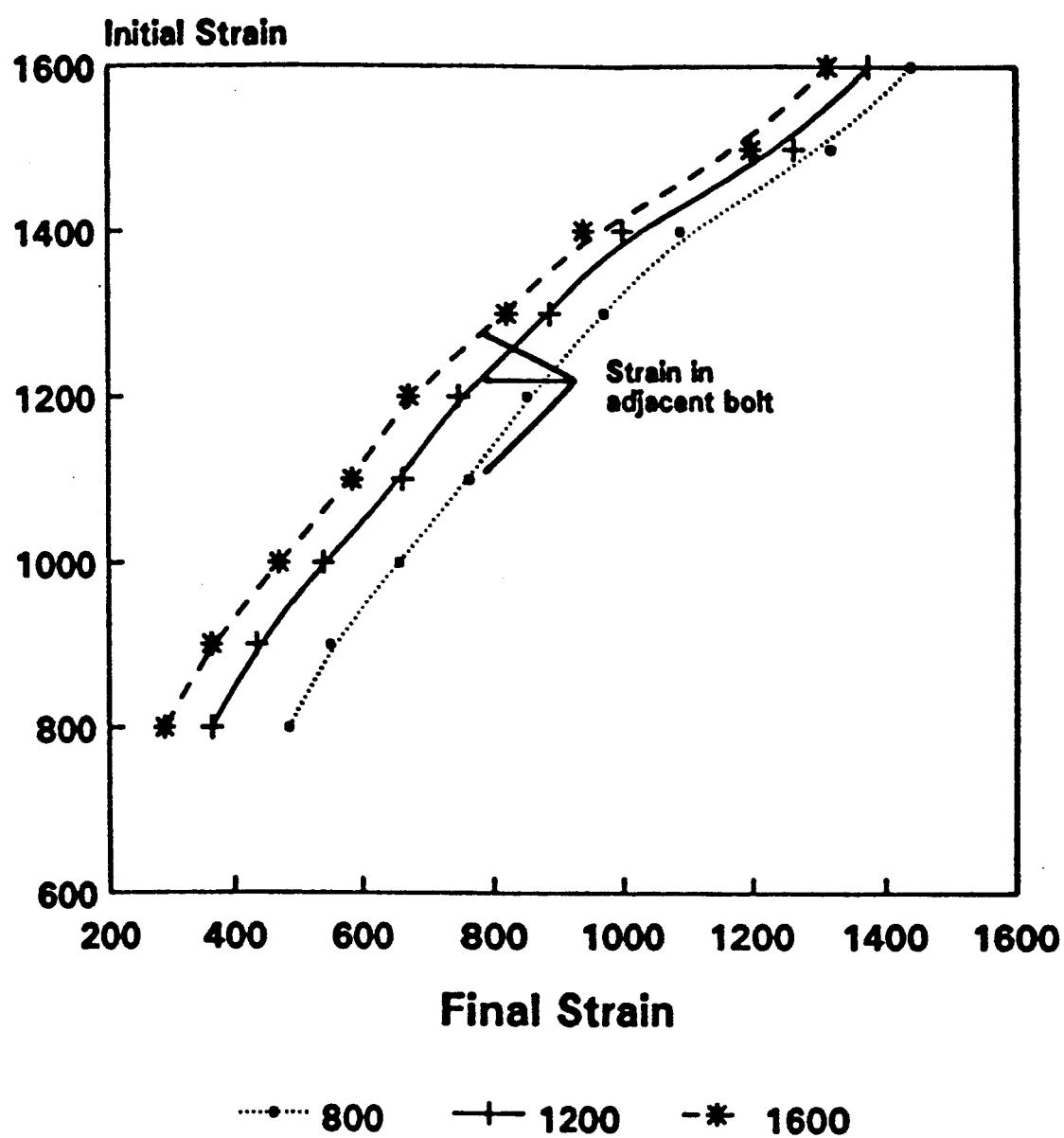
FIG. 4 is a graph illustrating initial verses final strain for various adjacent bolt strains in a tightening procedure using the method of the invention.

Turning now to FIG. 4, there is shown the relationship between initial bolt strain and final bolt strain for various adjacent bolt loads in the test system of Example 1. The data for the plots of FIG. 4 was obtained by tightening four bolts, one every 90%, to a specific initial strain. By tightening four bolts at diametrically opposed positions, effects of the rigid body motion of the flange are reduced or eliminated. Subsequent to this, an adjacent fifth bolt was tightened in increments with data being taken after every increment. As previously mentioned, bolting with high clamping force results in less interaction between fasteners in the system, as compared with interactions which occur with low clamping force. As seen in FIG. 4, relatively large variations are noted in final bolt strain at reduced initial strains. For example, when two adjacent bolts are tightened to 24,000 psi (approximately 800 microstrain), a 40% reduction of bolt load or an interaction coefficient of 0.40 for one of these bolts is found. Alternatively, when two adjacent bolts are tightened to 47,500 psi (approximately 1600 microstrain), only an 18% reduction of bolt load, or an interaction coefficient of 0.18 is noted. This effect is also seen in a comparison of coefficient matrices for the series of tests of Example 1. Several coefficients calculated from the three test sequence of Example 1 are found in Table 4 as follows.

TABLE 4

|        | a1,5    | a3,7    | a5,9    | a10,14  | Final Clamping Force |
|--------|---------|---------|---------|---------|----------------------|
| Test 1 | −0.4246 | −0.3976 | −0.3325 | −0.2497 | 452,000 lb.          |
| Test 2 | −0.3095 | −0.2887 | −0.2594 | −0.1946 | 621,900 lb.          |
| Test 3 | −0.3292 | −0.3122 | −0.2670 | −0.2010 | 616,200 lb.          |

In Table 4, each coefficient listed corresponds to adjacent bolt interaction. The interaction coefficients are highest in the first test, when the total clamping force subsequent to bolt tightening and including interaction effects is the lowest at 452,000 lbs. In the second test, the final clamping force is much higher at 621,900 lbs., and the interaction coefficients are much lower. The coefficients as seen in Table 4 are ordered by tightening sequence rather than bolt number, such that $A_{1,5}$ is the interaction coefficient for bolt 1 when the fifth bolt of the sequence is tightened. The fifth bolt of the sequence is actually the adjacent bolt 2. By ordering the interaction coefficients in this manner, inversion of the matrix to calculate initial preload is easier.

Also as seen in FIG. 4, the interaction coefficients become stable as the correct solution is approached. For example, the interaction coefficient for a bolt tightened to 30,000 psi (approximately 1,000 microstrain), with an adjacent bolt tightened to the same load is 0.405. However, if the initial bolt stress is altered by $\pm \times 15\%$, the interaction coefficient changes by only $\pm 2.5\%$. Any corresponding error in the final strain value is only approximately $\pm 1\%$, being within normal acceptable limits of error. A similar small change occurs in the interaction coefficient if the adjacent bolt stress is altered by $\pm 15\%$. In practice, a single test procedure will provide a prediction for initial bolt stress to achieve uniform bolt loading, and provides a selective overbolting procedure which will approximate uniform bolt stress. The interaction coefficients determined from a single test are somewhat inaccurate as interaction coefficients will change upon subsequent interactions in a tightening sequence. By means of a second test, wherein the interaction coefficients are refined and predictions of initial loading updated, an extremely accurate method for achieving uniform bolt stress is found. The predictions of initial loading to obtain uniform bolt stress may be used to develop a bolting procedure for subsequent bolting of a particular joint, wherein a one pass bolting procedure will be implemented with substantially uniform bolt stress being achieved. Alternatively, the method may be used in association with processing equipment to measure and calculate the interaction coefficients and update initial bolt loads to obtain uniform loading in a real time process. To achieve the necessary accuracy and therefore joint reliability, interaction coefficients are developed for each fastener in a particular system, as interactions between each bolt are not insignificant and flange surface misalignments will effect the interactions. The method of the invention provides a self-correcting procedure, which will account for surface misalignments, and may be used on bolted non-gasketed or gasketed joints of any type.

Although the invention has been described with reference to a preferred embodiment thereof, it should be recognized that various modifications would occur to those skilled in the art, and such modifications are contemplated by the invention. Therefore, the scope of the invention is only to be limited by the appended claims.

What is claimed is:

1. A method of tightening a joint having two members to be clamped together using a plurality of fasteners comprising the steps of:
   1) tightening said plurality of fasteners for said joint, each of said fasteners tightened to a pre-selected initial load,
   2) measuring first values representative of the stress, strain, load or elongation of each of said fasteners after initial loading thereof;
   3) determining an interaction coefficient for each of said fasteners from said first values;
   4) predicting an initial load value for each of said fasteners, and tightening each of said fasteners to the predicted initial load values,
   5) measuring second values representative of the stress, strain, load or elongation of each of said fasteners after tightening as set forth in step 4,
   6) updating said interaction coefficients for each of said fasteners based upon said second values, and
   7) calculating a preload value for each of said fasteners based on said updated interact coefficients to enable tightening of said joint with the final stress placed on each of said fasteners being substantially uniform.

2. The method of tightening a joint as in claim 1, wherein,
   said step of determining said interaction coefficient includes measuring stress values representative of fastener stress, strain, load or elongation of each fastener in the system after initial tightening thereof to said pre-selected initial loads, and calculating an interaction coefficient with respect to each subsequent fastener tightened in the system, wherein the interaction coefficient equals the sum of interaction coefficients with respect to each other fastener in the system, multiplied by said pre-selected initial load and divided by said measured first value for each of said fasteners.

3. The method of tightening a joint as in claim 1, wherein, said step of predicting initial load values includes determining a final target load for said fasteners of the system, and calculating an initial load value for each fastener in the system based upon the relationship;

$$\{S_i\} = [A]^{-1}\{S_f\}$$

where:
$\{S_i\}$ is a $1 \times n$ column matrix describing the initial load, stress or strain on each of the fasteners in the system,
$\{S_f\}$ is a $1 \times n$ column matrix corresponding to the final load, stress or strain on each of the fasteners in the system,
[A] is a $n \times n$ matrix that correctly transforms the matrix $S_i$ into the $S_f$, and
n equals the number of fasteners in the system.

4. The method of tightening a joint as in claim 1, further comprising the steps of:
   updating predictions of initial load values for each of said fasteners based upon said updated interaction coefficients, and tightening each of said fasteners to the updated prediction for the initial load value thereof, measuring third stress, strain, load or elongation values for each of said fasteners after tightening to the updated predicted initial load values, updating said interaction coefficients for each of said fasteners based at least upon said third strain values, and calculating the preload for each of said fasteners.

5. The method of tightening a joint as in claim 1, wherein,
said joint also includes a gasket member interposed between said two members to be clamped together.

6. The method of tightening a joint as in claim 1, wherein,
said interaction coefficients define the relationship between initial fastener load, final fastener load and the initial load of other fasteners in the system.

7. A method of tightening threaded fasteners associated with a joint system having at least two members to be clamped together using a plurality of fasteners, comprising the steps of:

1) determining a target stress for said plurality of fasteners to be used in tightening of said joint system;
2) tightening said plurality of fasteners to a preselected initial load,
3) measuring a value indicative of the stress on each of said fasteners after initial loading thereof, and calculating an interaction coefficient for each of said fasteners from said measured values,
5) calculating a predicted preload value for each of said fasteners based upon the calculated interaction coefficient and said target stress for each of said fasteners,
6) tightening each of said fasteners to said predicted preload values, and repeating the step of measuring a value indicative of the stress on each of said fasteners, to allow updating of said interaction coefficients for each of said fasteners, wherein said updated interaction coefficients are then used to predict a preload value for each of said fasteners which will enable substantially uniform stress to be distributed to each of said fasteners in said joint system.

* * * * *